United States Patent [19]
Patel et al.

[11] Patent Number: 5,353,426
[45] Date of Patent: Oct. 4, 1994

[54] CACHE MISS BUFFER ADAPTED TO SATISFY READ REQUESTS TO PORTIONS OF A CACHE FILL IN PROGRESS WITHOUT WAITING FOR THE CACHE FILL TO COMPLETE

[75] Inventors: Rajiv N. Patel, San Jose, Calif.; Adam Malamy, Winchester, Mass.; Norman M. Hayes, Sunnyvale, Calif.

[73] Assignee: Sun Microsystems, Inc., Mountain View, Calif.

[21] Appl. No.: 875,983

[22] Filed: Apr. 29, 1992

[51] Int. Cl.$^5$ .............................................. G06F 13/00
[52] U.S. Cl. ................................................... 395/425
[58] Field of Search ................................. 395/400, 425

[56] References Cited

U.S. PATENT DOCUMENTS 4,768,148  8/1988  Keeley et al. ..................... 395/425
5,253,358  10/1993  Thoma, III et al. .......... 364/DIG. 1

OTHER PUBLICATIONS

Method and Cache Memory Controller For Fetching Data For A CPU That Further Reduces CPU Idle Time.

Primary Examiner—David L. Robertson
Attorney, Agent, or Firm—Blakely Sokoloff Taylor & Zafman

[57] ABSTRACT

A cache array, a cache tag and comparator unit and a cache multiplexor are provided to a cache memory. Each cache operation performed against the cache array, read or write, takes only half a clock cycle. The cache tag and comparator unit comprises a cache tag array, a cache miss buffer and control logic. Each cache operation performed against the cache tag array, read or write, also takes only half a clock cycle. The cache miss buffer comprises cache miss descriptive information identifying the current state of a cache fill in progress. The control logic comprises a plurality of combinatorial logics for performing tag match operations. In addition to standard tag match operations, the control logic also conditionally tag matches an accessing address against an address tag stored in the cache miss buffer. Depending on the results of the tag match operations, and further depending on the state of the current cache fill if the accessing address is part of the memory block frame of the current cache fill, the control logic provides appropriate signals to the cache array, the cache multiplexor, the main memory and the instruction/data destination. As a result, subsequent instruction/data requests that are part of a current cache fill in progress can be satisfied without having to wait for the completion of the current cache fill, thereby further reducing cache miss penalties and function unit idle time.

18 Claims, 4 Drawing Sheets

CACHE MISS BUFFER ADAPTED TO SATISFY READ REQUESTS TO PORTIONS OF A CACHE FILL IN PROGRESS WITHOUT WAITING FOR THE CACHE FILL TO COMPLETE

BACKGROUND OF THE INVENTION

1. Field of the Invention

The present invention relates to the field of computer systems and their cache memory. More particularly, the present invention relates to cache misses.

2. Art Background

Typically the Central Processing Unit (CPU) in a computer system operates at a substantially faster speed than the main memory. In order to avoid having the CPU idle too often while waiting for data or instructions from the main memory, a cache memory which can operate at a higher speed than the main memory is often used to buffer the data and the instructions between the main memory and the CPU. The data and instructions in memory locations of the main memory are mapped into the cache memory in block frames. Each block frame comprises a plurality of block offsets corresponding to a plurality of memory locations storing a plurality of the data and instructions. To further improve the overall CPU performance, some computer systems employ separate cache memories, one for data and one for instructions.

However, the use of separate cache memories does not solve the problem entirely. When cache read miss occurs, that is, when the datum or instruction requested by the CPU is not in the cache memory, the cache memory has to retrieve the datum or instruction from the main memory. To do so, typically the entire block frame of data or instructions comprising the requested datum or instruction is retrieved, and the CPU goes idle until the retrieval is completed. For other cache performance problems and improvement techniques, see J. L. Hennessy, and D. A. Patterson, *Computer Architecture—A Quantitative Approach*, pp. 454–461, (Morgan Kaufmann, 1990).

The amount of time it takes to fill the cache memory with the replacement block frame is dependent on the block size and the transfer rate of the cache memory-main memory hierarchy. For example, if the block size is eight (8) words and the speed of the main memory is two (2) block offsets per three (3) clock cycles, then it takes eleven (11) clock cycles to fill the cache memory with the replacement block frame, assuming memory accesses are pipelined. Reducing the block frame size or filling a partial block on cache read miss does not necessarily reduce the CPU idle time, since it will increase the likelihood of future cache read misses.

Various techniques have been used to minimize the amount of CPU idle time waiting for the cache memory when cache read misses occur. One common practice is early restart, that is, as soon as the requested datum or instruction arrives, it is sent to the CPU without waiting for the writing of the entire block to be completed. Therefore, the CPU may resume its execution while the rest of the replacement block frame is being written.

A further refinement of the early restart technique is out of order fetch which is a request to the main memory to retrieve the requested datum or instruction first, skipping all the data or instructions before the requested datum or instruction in the replacement block frame. Like the early restart, the retrieved datum or instruction is sent to the CPU as soon as it is retrieved. Again, the CPU may resume its execution while the rest of the replacement block frame is being retrieved. After retrieving the requested datum or instruction, the main memory continues to retrieve the remaining data and instructions in the replacement block frame, starting with the data and instruction after the requested datum or instruction, and loops around to retrieve the previously skipped data or instructions at the beginning of the block frame, until the end of the block frame is reached. Thus, the CPU can resume execution as soon as the first datum or instruction is retrieved from the main memory.

However, traditional cache memory typically do not allow read and write operations to be performed against them in the same clock cycle. This makes the handling of another request from the CPU while trying to fill the rest of the replacement block frame complicated. As a result, the CPU typically goes idle again after the datum or instruction is executed, and waits for the remaining retrievals to be completed. The CPU goes idle and waits, even if the subsequent datum or instruction requested by the CPU is already in the cache memory or part of the remaining data or instructions being retrieved. Thus, the benefits from early restart and out of order fetch is limited, if the CPU is likely to complete its execution before the rest of the replacement block frame is written. This is especially likely to occur on computer systems where the number of clock cycles required to execute a typical instruction is small, for example, RISC computers, in particular, Super-Scaler RISC computers where more than one instruction is executed in each clock cycle.

Today, some modern cache memory do allow read and write operations to be performed against them in the same clock cycle, thus providing new opportunities for further reducing cache miss penalties, particularly CPU idle time, and improving cache and overall system performance. Subsequent requests for data or instructions that are in the cache memory can be satisfied during the second half of the clock cycle. The problem is knowing that the data or instructions are in the cache memory and synchronizing their read out from the cache memory to the second half of the clock cycle, without substantial investment in additional hardware. Likewise, to satisfy the subsequent requests for data or instructions that are in the process of being retrieved from the main memory, the problem is knowing when the data or instructions are retrieved and synchronizing their direct transfer to CPU with their retrieval, without substantial investment in additional hardware.

Thus, it is desirable to provide a new approach to fetching data from cache memory which allow read and write operations to be performed in the same clock cycle that further reduces CPU idle time. It is particularly desirable if cache miss penalties are reduced. It is also desirable if subsequent data being fetched by the CPU can be returned to the CPU during a cache memory fill and without having the CPU remain idle waiting for the cache memory fill to complete, if the data being fetched is part of the memory block frame currently being cached.

As will be described, these objects and desired results are among the objects and desired results of the present invention, which overcomes the disadvantages of the prior art, and provides a method and cache memory controller for fetching data for a CPU that further reduces CPU idle time.

SUMMARY OF THE INVENTION

A method and apparatus for caching instruction/data that further reduces cache miss penalties is disclosed. In the present invention, a cache array, a cache tag and comparator unit, and a cache multiplexor are provided to a cache memory. Together, these elements cooperate to provide instruction/data for execution in a manner that further reduces cache miss penalties.

In one embodiment, the cache array comprises a plurality of cache sets, with each cache set having a plurality of cache lines for storing a subset of instruction/data stored in main memory. Each cache operation performed against the cache array, read or write, takes only half of a clock cycle to complete. Thus, up to two cache operations can be performed against the cache array in one clock cycle.

The cache tag and comparator unit comprises a cache tag array, a cache miss buffer, and control logic. In one embodiment, the cache tag array comprises a plurality of corresponding cache set entries. Each cache set entry comprises an address tag and a number of control bits for each of the cache lines of the corresponding cache set. Together, these elements describe which memory block frames are currently cached, and where they are cached in the cache array. Similar to the cache array, each cache operation against the cache tag array, read or write, takes only half a clock cycle to complete. In its presently preferred form, the cache miss buffer comprises a number of storage locations for storing an enabling indicator, an address tag, an index, a number of valid bits and a block value. Together, these elements describe the current state of a cache fill in progress. The control logic comprises a plurality of combinatorial logics for performing tag match operations. In addition to standard tag match operations performed against the address tags of a selected cache set entry, the control logic also conditionally performs tag match operation on the accessing address against the address tag stored in the cache miss buffer. Depending on the results of the tag match operations, and depending on whether the instruction/data has been retrieved and stored in the selected cache line if it is determined that the instruction/data being fetched is part of the memory block frame of the current cache fill in progress, the control logic provides appropriate signals to the cache array, the main memory and the instruction/data destination.

As a result, an instruction/data requesting an instruction/data that is part of a memory block frame of the current cache fill in progress can be satisfied without having to wait for the current cache fill to complete, thereby further reducing cache miss penalties and function unit idle times.

BRIEF DESCRIPTION OF THE DRAWINGS

The objects, features and advantages of the present invention will be apparent from the following detailed description of the preferred embodiment of the invention with references to the drawings in which.

DETAILED DESCRIPTION PRESENTLY PREFERRED AND ALTERNATE EMBODIMENTS

A method and apparatus for caching instruction/data that further reduces cache miss penalties is disclosed. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
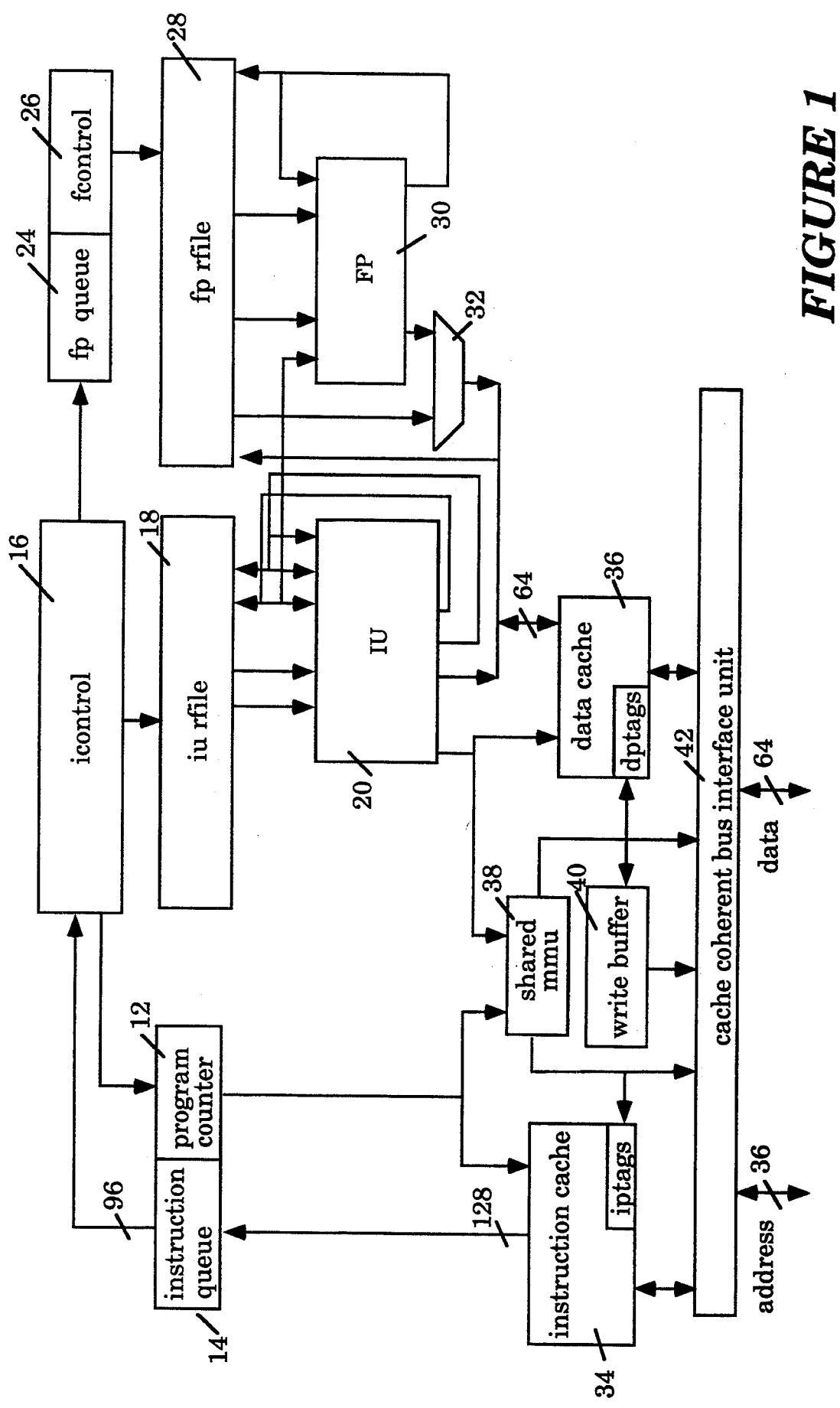
FIG. 1 shows a functional block diagram illustrating a processor that incorporates the teachings of the present invention.

Referring now to FIG. 1, a functional block diagram illustrating an exemplary processor incorporating the teachings of the present invention is shown. Shown is an exemplary processor 10 comprising an instruction cache 34, a data cache 36, a shared memory management unit 38, a write buffer 40, and a cache coherent bus interface unit 42. The instruction and data caches, 34 and 36, are coupled to the shared memory management unit 38, and the cache coherent bus interface unit 42. The data cache 36 is also coupled to the write buffer 40. The shared memory management unit 38 and the write buffer 40 are also coupled to the cache coherent bus interface unit 42, which in turn is coupled to the main memory (not shown). Together, these elements cooperate to provide instructions and data for execution in a manner that further reduces cache miss penalties; in particular, function unit idle time.

The shared memory management unit 38, the write buffer 40 and the cache coherent bus interface unit 42 are intended to represent a broad category of these elements found in most processors. Their basic functions and constitutions are well known and will not be described further. The instruction and data caches, 34 and 36, will be described in further detail later with references to FIGS. 2-5.

Continuing to refer to FIG. 1, the processor further comprises a program counter 12, an instruction queue 14 and an instruction control unit 16. The program counter 12, the instruction queue 14, and the instruction control unit 16 are coupled to each other. Additionally, the program counter 12 is coupled to the shared memory management unit 38, and the instruction cache 34, while the instruction queue 14 is also coupled to the instruction cache 34. Together, they cooperate to issue instructions for execution.

The program counter 12, the instruction queue 14, and the instruction control unit 16, are intended to represent a broad category of these elements found in most processors. Their basic functions and constitutions are well known and will not be described further.

Still referring to FIG. 1, the processor 10 further comprises an integer unit register file 18, an integer function unit 20, a floating point instruction queue 24, a floating point control unit 26, a floating point unit register file 28, a floating point function unit 30, and a multiplexor 32. The integer unit register file 18 is coupled to the instruction control unit 16, and the integer function unit 20, which in turn is coupled to the shared memory management unit 38 and the data cache 36. The floating point instruction queue 24 is coupled to the instruction control unit 16, and the floating point instruction control unit 26, which in turn is coupled to the floating point unit register file 28. The floating point unit register file 28 is also coupled to the floating point unit 30, the data cache 36 directly, and indirectly through the multiplexor. The floating point unit is also coupled to the data cache 36 indirectly through the multiplexor 32. Together, these elements cooperate to generate integer and floating point results.

The integer register file 18, the integer function unit 20, the floating point instruction queue 24, the floating point instruction control unit 26, the floating point unit register file 28, the floating point unit 30, and the multiplexor 32 are intended to represent a broad category of these elements found in most processors. Their basic functions and constitutions are well known and will not be described further.

While, for ease of understanding the present invention, the present invention is being described with the exemplary processor 10, it will be obvious from the descriptions to follow, the present invention may be practiced with processors of other architectures. In particular, the present invention may be practiced without dividing the cache memory into an instruction and a data cache.

Figure 2:
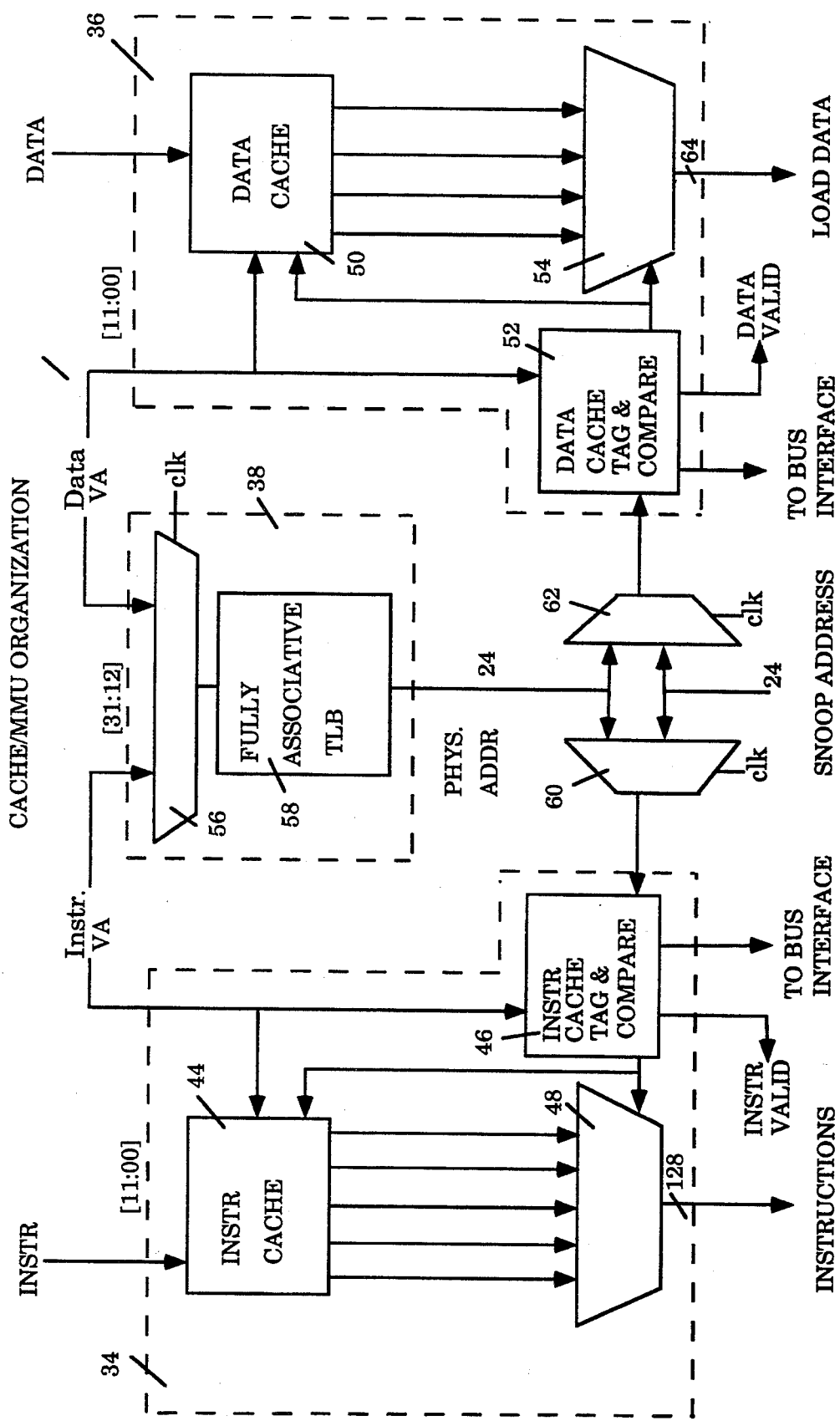
FIG. 2 shows a functional block diagram illustrating the instruction and data caches, and the memory management unit of the processor of FIG. 1.

Referring now to FIG. 2, a functional block diagram illustrating the memory management unit, the instruction and data cache of FIG. 1 is shown. Shown is the instruction cache 34 comprising an instruction cache array 44, an instruction cache tag and compare unit 46, and a multiplexor 48. The instruction cache array 44 and the instruction cache tag and compare unit 46 are coupled to the program counter and the multiplexor 48, which in turn is coupled to the instruction queue. The instruction cache array 44 is also coupled to the main memory via the cache coherent bus interface unit, while the instruction cache tag and compare unit 46 is also coupled to the memory management unit 38 via the multiplexor 60. Together, these elements cooperate to provide instructions to the instruction queue in a manner that reduces cache miss penalties, in particular, function unit idle time.

The instruction cache array 44 comprises a plurality of cache lines for storing a subset of instructions stored in main memory in a set associative manner. The instruction cache array 44 receives instructions from main memory and cache line select signals from the instruction cache tag and compare unit 46 as inputs. In response, the instruction cache array 44 stores the received instructions in the selected cache line. Selection of cache lines may be implemented with any of the well known manners. Although the present invention is being described with the instruction cache array using set associative mapping, it will be appreciated that the present invention may be practiced with the instruction cache array using other mapping techniques.

Additionally, the instruction cache array 44 receives virtual addresses from the program counter logic as inputs. In response, for each virtual address, the instruction cache array 44 outputs the instructions stored in the set of cache lines corresponding to the virtual address to the multiplexor 48. Although the present invention is being described with the initial selection of a set of cache lines using virtual addresses and the tag match done using physical addresses, it will be appreciated that the present invention may be practiced without such initial selection of a set of instruction cache lines and without using physical addressing for tag match operation.

Each cache operation, read or write, against the instruction cache array 44 takes only half a clock cycle to complete. Thus, two cache operations can be performed against the instruction cache array 44 in one clock cycle. In other words, a cache read operation can be performed against the instruction cache array 44 in the first half of a clock cycle, and followed by a cache write operation in the second half of the clock cycle.

The instruction cache tag and compare unit 46 receives virtual addresses from the program counter logic and either physical addresses from the memory management unit or snoop addresses from the cache coherent bus interface unit as inputs. In response, for each set of input, the instruction cache tag and compare unit 46 outputs the appropriate signals for the instruction queue, the instruction cache multiplexor 48, and main memory. The instruction cache tag and compare unit 46 will be described in further detail later with references to FIGS. 3-5. While the present invention is being described with the instruction cache tag and compare unit 46 receiving snoop addresses as inputs, it will be appreciated that the present invention may be practiced on computer systems with single instruction cache memory and with computer systems having no snoop addresses.

The data cache array 50 and the data cache tag and compare unit 52 are coupled to the integer function unit and the multiplexor 54, which in turn is coupled to the integer and floating point unit register files, and the integer and floating point function units. The data cache array 50 is also coupled to the main memory via the cache coherent bus interface unit, while the data cache tag and compare unit 52 is also coupled to the memory management unit 38 via the multiplexor 62. Together, these elements cooperate to provide data to the integer and floating unit register files, and the integer and floating point function unit in a manner that reduces cache miss penalties, in particular, function unit idle time.

Similar to the instruction cache array 44, the data cache array 50 comprises a plurality of cache lines for storing a subset of data stored in main memory in a set associative manner. The data cache array 50 receives data from main memory and cache line select signals from the data cache tag and compare unit 52 as inputs. In response, the data cache array 50 stores the received data in the selected cache line. Selection of cache lines may also be implemented with any of the well known manners. Similarly, although the present invention is being described with the data cache array using set associative mapping, it will be appreciated that the present invention may be practiced with the data cache array using other mapping techniques.

Additionally, the data cache array 50 receives virtual addresses from the integer function unit as inputs. In response, for each virtual address, the data cache array 50 outputs the data stored in the set of cache lines corresponding to the virtual address to the multiplexor 54. Likewise, although the present invention is being described with the initial selection of a set of cache lines using virtual addresses and tag match done using physical addresses, it will be appreciated that the present invention may be practiced without such initial selection of a set of data cache lines and without using physical addressing for tag match operation.

Similar to the instruction cache tag array 44, each cache operation, read or write, against the data cache array 50 also takes only half a clock cycle to complete. Thus, two cache operations can be performed against the data cache array 50 in one clock cycle. In other words, a cache write operation can be performed against the data cache array 50 in the first half of a clock cycle, and followed by a cache read operation in the second half of the clock cycle.

The data cache tag and compare unit 52 receives virtual addresses from the integer function unit and either physical addresses from the memory management unit or snoop addresses from the cache coherent bus interface unit as inputs. In response, for each set of input, the data cache tag and compare unit 46 outputs the appropriate signals to the register files or function units, the data cache multiplexor 52 and the main memory. The data cache tag and compare unit 52 will be described in further detail later with references to FIGS. 3-5. While the present invention is being described with the data cache tag and compare unit 52 receiving snoop addresses as inputs, it will be appreciated that the present invention may be practiced on computer systems with single instruction cache memory and with computer systems having no snoop addresses.

Also shown in FIG. 2 is the memory management unit 38 comprising a multiplexor 56, and a fully associative translation lookaside buffer 58, coupled to each other. In addition, the multiplexor 56 is also coupled to the program counter and the integer function unit, while the translation lookaside buffer is also coupled to the instruction and data caches, 34 and 36, through the multiplexors, 60 and 62, respectively. Together, these elements cooperate to translate virtual addresses to physical addresses for the instruction and data caches, 34 and 36. The multiplexor 56 and the translation lookaside buffer 58 are intended to represent a broad category of these elements found in most processors. Their constitutions and functions are well known and will not be further described here.

Figure 3:
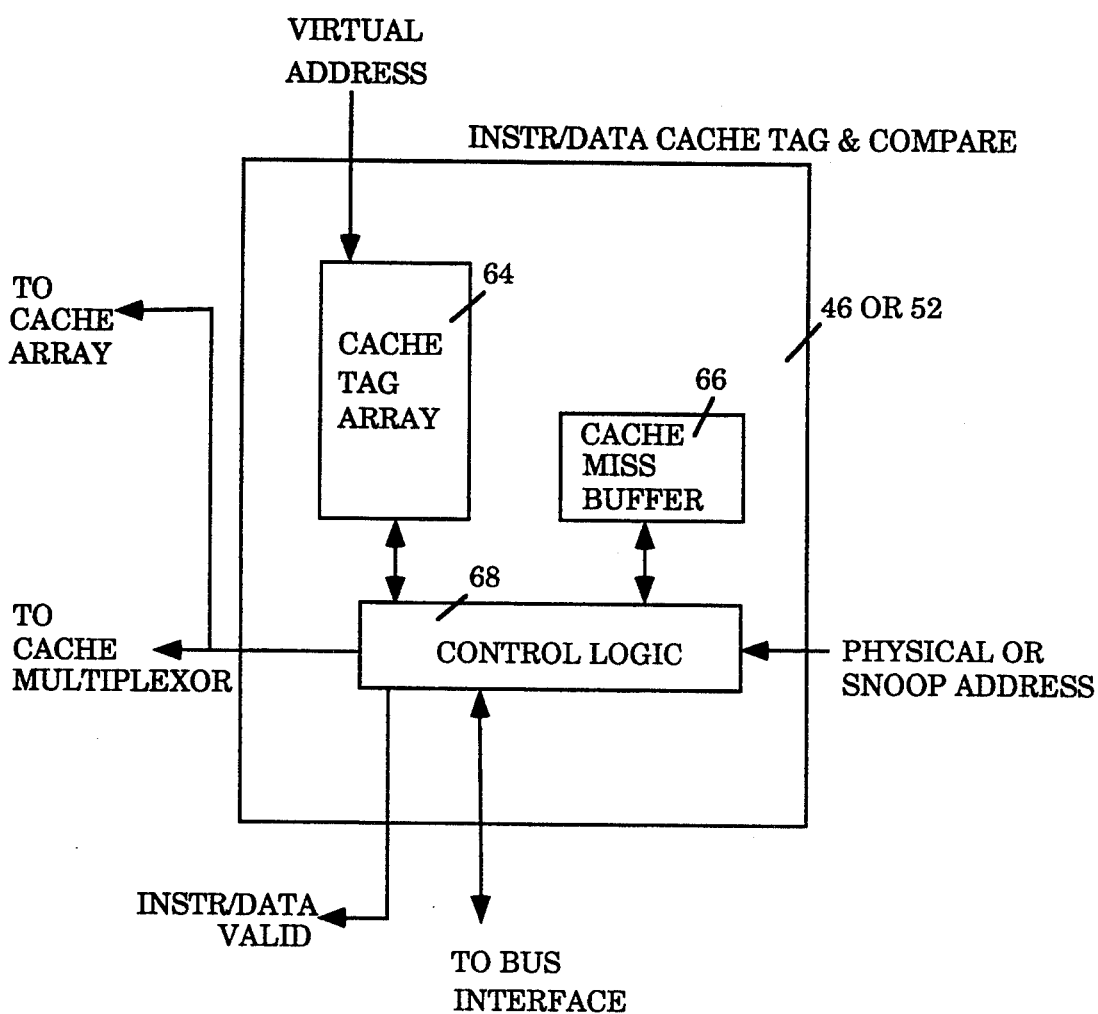
FIG. 3 shows a function block diagram illustrating the instruction/data cache tag and comparator unit of the instruction/data cache of FIG. 2.

Referring now to FIG. 3, a function block diagram illustrating the instruction/data cache tag and compare unit of FIG. 2 is shown. Shown is an instruction/data cache tag and compare unit, 46 or 52, comprising a cache tag array 64, a cache miss buffer 66, and control logic 68. The cache tag array 64 and the cache miss buffer 66 are coupled to the control logic 68. In addition, the cache tag array 64 is coupled to a virtual address input source, i.e. the program counter logic or the integer function unit. The control logic 68 is also coupled to the instruction/data cache array, the instruction/data cache multiplexor, the instruction/data destinations, the physical address sources, and the main memory via the cache coherent bus interface unit. The instruction/data destinations are the instruction queue, the register files and the function units. The physical address sources are the memory management unit and other instruction/data cache memory. Together, these elements cooperate to provide memory read signals to main memory, cache line select signals to the cache array, input line select signal to the cache multiplexor, and instruction/data valid signal to instruction/data destinations.

The instruction/data cache tag array 64 comprises a plurality of corresponding instruction/data cache set entries. Each instruction/data cache set entry comprises an address tag and a number of control bits for each cache line of the corresponding instruction/data cache set. Similar to the instruction/data cache arrays, each cache operation against the instruction/data cache tag array 64 also takes only half a clock cycle to complete. Except for cache operation completion clock rate, the instruction/data cache tag array 64 is intended to represent a broad category of tag arrays found in most processors. Its constitutions and basic functions are well known and will not be described further.

The instruction/data cache miss buffer 66 comprises a plurality of storage locations. The instruction/data cache miss buffer 66 receives cache miss descriptive information as inputs. In response, the instruction/data cache miss buffer 66 stores them in the appropriate storage locations. In addition, the instruction/data cache miss buffer 66 receives read signals as inputs. In response, the instruction/data cache miss buffer 66 outputs the appropriate cache miss information stored. Similar to the instruction/data cache tag array 64, each read or write operation against the instruction/data cache miss buffer 66 also takes only half of a clock cycle. The cache miss descriptive information will be described in further detail later with references to FIG. 4. The manner in which the instruction/data cache miss buffer 66 cooperates with the instruction/data cache tag and compare control logic will be described in further detail with references to FIG. 5.

The instruction/data cache tag and compare control logic 68 comprises a plurality of combinatorial logics. The instruction/data cache tag and compare control logic 68 receives instruction/data address tags from the instruction/data cache tag array, instruction/data cache miss descriptive information from the instruction/data cache miss buffer, and either physical addresses from the memory management unit or snoop addresses from the cache coherent bus interface unit as inputs. In response, the instruction/data cache tag and compare control logic 68 performs tag match operations, and outputs appropriate signals to the instruction/data cache array, the instruction/data cache multiplexor, the main memory, instruction queue, the register files and the function units. The instruction/data cache tag and compare control logic will be described in further detail below with references to FIG. 5.

Figure 4:
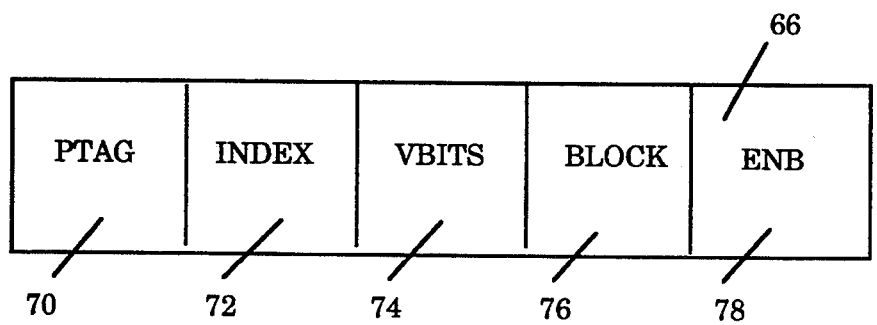
FIG. 4 shows a block diagram illustrating the cache miss buffer of the instruction/data cache tag and comparator unit of FIG. 3.

Referring now to FIG. 4, a block diagram illustrating the instruction/data cache miss descriptive information stored in the instruction/data cache miss buffer of FIG. 3 is shown. Shown is the instruction/data cache miss descriptive information comprising an address tag, 70, an index 72, a number of valid bits 74, a block value 76, and an enabling indicator 78. Together, they cooperate to describe the current state of a cache fill.

The enabling indicator 78 is set if a cache fill is in progress. When the enabling indicator 78 is set, the cache miss descriptive information stored in the instruction/data cache miss buffer 66 is included in the tag match operations. The address tag 70 identifies the memory block frame being retrieved from main memory by the cache fill in progress. The index 72 identifies the instruction/data cache set where the memory block frame is being stored by the cache fill in progress. The block value 76 identifies which cache line of the instruction/data cache set the memory block frame is being stored by the cache fill in progress. The valid bits 74 are set if their corresponding block offsets have been stored in the cache line of the instruction/data cache set identified by the index 72 and the block value 76.

Figure 5:
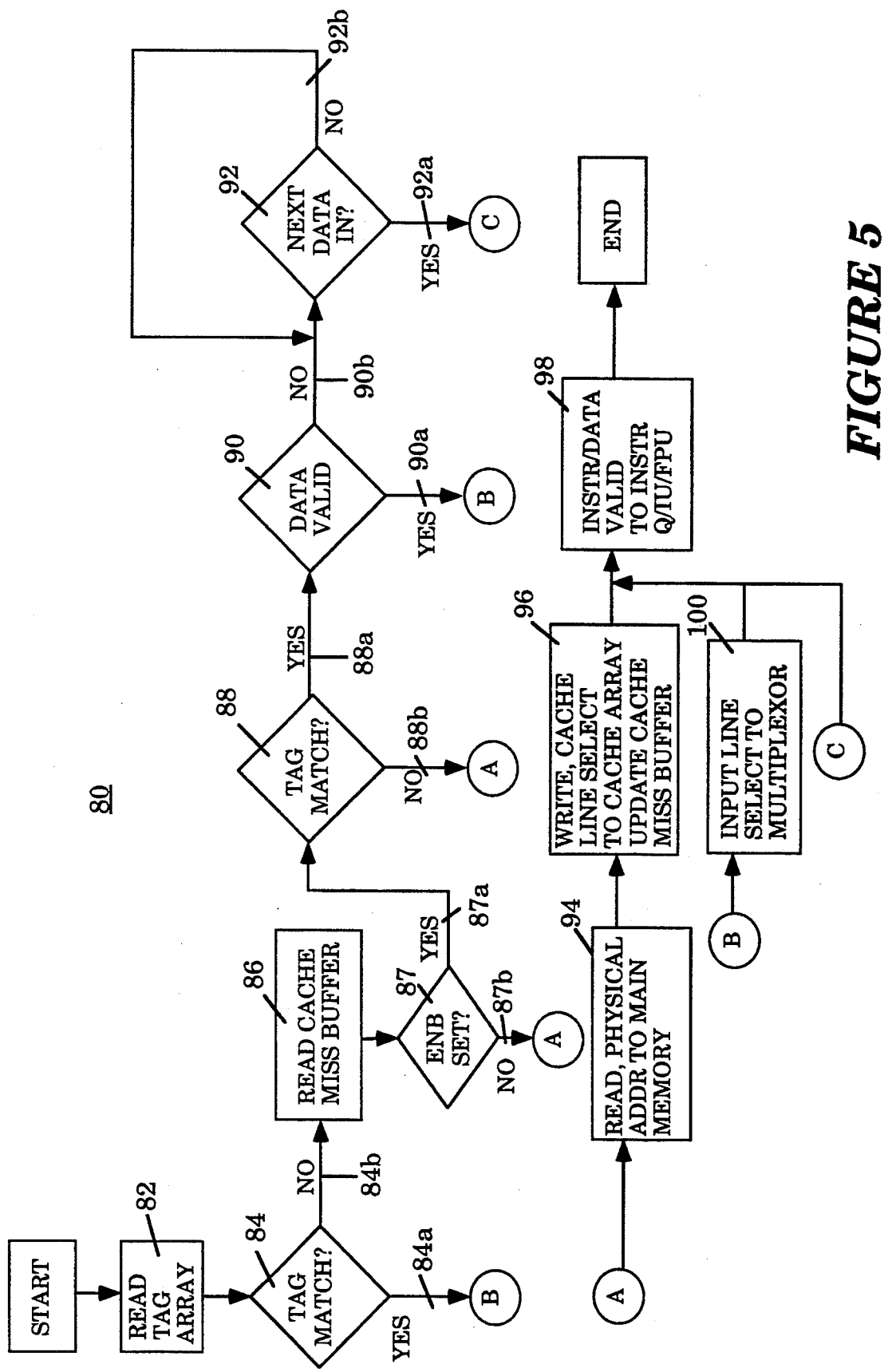
FIG. 5 shows a flow diagram illustrating the logical flow of the control logic of the instruction/data cache tag and comparator unit of FIG. 3.

Referring now to FIG. 5, a flow diagram illustrating the logical flow of the control logic of the instruction/data cache tag and compare unit of FIG. 3 is shown. Initially, the control logic reads a number of address tags simultaneously from the instruction/data cache tag array, block 82. The address tags are read from the instruction/data cache set entry indexed by the virtual address. The control logic then performs tag match operations against these address tags, block 84. If a match is found (cache hit), branch 84a, the control logic causes input line select signals to be provided to the instruction/data cache multiplexor, block 100. In addition, the control logic causes instruction/data valid signal to be provided to the instruction queue, one of the register files, or one of the function units, block 98.

If a match is not found, branch 84b, the control logic reads the cache miss descriptive information from the instruction/data cache miss buffer, block 86. The control logic then checks to see if the enabling indicator is set, block 87. If the enabling indicator is set, branch 87a, the control logic performs a tag match operation against the address tag of the cache fill in progress, block 88.

If the enabling indicator is not set, branch 87b, or the additional tag match operation failed, branch 88b, (cache miss), the control logic causes read signals and the physical address to be sent to the main memory, block 94. The control logic also causes write and cache line select signals to be sent to the instruction/data cache array, updates the cache miss descriptive information and enables the enabling indicator in the instruction/data cache miss buffer, block 96. In addition, the control logic causes instruction/data valid signals to be provided to the instruction queue, one of the register files, or one of the function units, block 98.

If the enabling indicator is set, and the additional tag match operation is successful, branch 88a, (cache miss, but instruction/data is part of the memory block frame of the cache fill in progress), the control logic further examines the valid bits to determine if the particular instruction/data has been retrieved from the main memory and stored into the selected cache line, block 90. If the instruction/data has been retrieved and stored, branch 90a, the control logic causes input line select signals to be provided to the instruction/data cache multiplexor, block 100. In addition, the control logic causes instruction/data valid signal to be provided to the instruction queue, one of the register file, or one of the function units, block 98.

If the instruction/data has not been retrieved and stored in the selected cache line, the control logic further determines, using the valid bits, whether the instruction/data is the next instruction/data being returned from the main memory, block 92. If the instruction/data is not the next instruction/data being returned, branch 92b, the control logic repeats the determination until the instruction/data is going to be the next instruction/data being returned. Upon determining that the instruction/data is going to be the next instruction/data being returned, branch 92a, the control logic causes instruction/data valid signals to be provided to the instruction queue, one of the register files, or one of the function units, block 98.

While the logical flow of the control logic has been described with the reading of the tag array and the reading of the cache miss buffer, blocks 82 and 86, and the first and second tag match, blocks 84 and 88, as separate steps, it will be appreciated that operationally, the tag array and cache miss buffer may be read concurrently, blocks 82 and 86, and the first and second tag match may also be performed concurrently, blocks 84 and 88.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a computer system, a method for caching instruction/data that further reduces cache miss penalties, said method comprising the steps of:
   a) storing a plurality of memory block frames of a main memory of said computer system in a plurality of cache lines of a cache array;
   b) storing a plurality of address tags for said cached memory block frames in a plurality of cache tag entries of a cache tag array corresponding to said cache lines;
   c) storing cache fill descriptive information for a memory block frame of a cache fill in progress in a cache miss buffer;
   d) determining cache hit/miss for an instruction/data request using said address tags for said cached memory block frames and said cache fill descriptive information; and
   e) providing appropriate signals to said cache array, said main memory, and a destination for an instruction/data requested by said instruction/data request accordingly such that said instruction/data request is satisfied if said instruction/data requested is part of said memory block frame of said cache fill in progress, without having to wait for said cache fill to be completed, thereby further reducing cache miss penalties.

2. The method as set forth in claim 1, wherein,
said cache fill description information stored in said step c) comprises an address tag and an active indicator for said memory block frame of said cache fill in progress; and
said step d) further comprises the steps of:
   d.1) matching a read address of said instruction/data request against said address tags of said memory block frames to determine whether said instruction/data requested is cached in said cache lines;
   d.2) matching said read address against said address tag of said memory block frame of said cache fill in progress to determine whether said instruction/data requested is part of said memory block frame of said cache fill in progress if no match is found for said matchings in said step d.1) and said active indicator is set.

3. The method as set forth in claim 2, wherein,
said cache fill descriptive information stored in said step c) further comprises a progress indicator; and
said step d) further comprises the step of:
   d.3) determining whether said instruction/data requested has been retrieved from said main memory and stored into one of said cache lines using said progress indicator of said cache fill in progress if a match was determined in said matching in said step d.2).

4. The method as set forth in claim 2, wherein,
said cache fill descriptive information stored in said step c) further comprises a progress indicator; and
said step d) further comprises the step of:
 d.3) determining whether said instruction/data requested is going to be the next instruction/data being returned from said main memory using said progress indicator of said cache fill in progress if a match was determined in said matching in said step d.2).

5. The method as set forth in claim 1, wherein,
said memory block frames of said main memory are stored in said cache lines in said step a) in a set associative manner; and
said cache fill descriptive information stored in said step c) further comprises an index and a block value, said index identifying a cache set for storing said memory block frame of said cache fill in progress, said block value identifying a cache line of said cache set for storing said memory block frame of said cache fill in progress.

6. The method as set forth in claim 1, wherein, each cache operation performed against said cache array and said cache tag array takes only half of a clock cycle.

7. The method as set forth in claim 1, wherein,
said cache array is an instruction cache array;
said cache tag array is an instruction cache tag array;
said cache miss buffer is an instruction cache miss buffer; and
said instruction/data request is an instruction request.

8. The method as set forth in claim 1, wherein,
said cache array is a data cache array;
said cache tag array is a data cache tag array;
said cache miss buffer is a data cache miss buffer; and
said instruction/data request is a data request.

9. In a computer system, an apparatus for caching instruction/data that further reduces cache miss penalties, comprising:
 a) a cache array coupled to a main memory of said computer system comprising a plurality of cache lines for storing a plurality of memory block frames of said main memory;
 b) a cache tag array comprising a plurality of cache tag entries corresponding to said cache lines for storing a plurality of address tags for said cached memory block frames;
 c) a cache miss buffer for storing cache fill descriptive information for a memory block frame of a cache fill in progress;
 d) control logic coupled to said main memory, said cache array, said cache tag array, and said cache miss buffer for determining cache hit/miss for an instruction/data request using said address tags for said cached memory block frames and said cache fill descriptive information, and providing appropriate signals to said cache array, said main memory, and a destination for an instruction/data requested by said instruction/data request accordingly such that said instruction/data request is satisfied if said instruction/data requested is part of said memory block frame of said cache fill in progress, without having to wait for said cache fill to be completed, thereby further reducing cache miss penalties.

10. The apparatus as set forth in claim 9, wherein,
said cache fill description information stored in said cache miss buffer comprise an address tag and an active indicator for said memory block frame of said cache fill in progress; and
said control logic comprises:
 d.1) first matching logic coupled to said cache tag array for matching a read address of said instruction/data request against said address tags of said memory block frames to determine whether said instruction/data requested is cached in said cache lines; and
 d.2) second matching logic coupled to said cache miss buffer for matching said read address against said address tag of said memory block frame of said cache fill in progress to determine whether said instruction/data requested is part of said memory block frame of said cache fill in progress if no match is found by said first matching logic and said active indicator is set.

11. The apparatus as set forth in claim 10, wherein,
said cache fill descriptive information stored in said cache miss buffer further comprises a progress indicator; and
said control logic further comprises:
 d.3) determining logic coupled to said cache miss buffer for determining whether said instruction/data requested has been retrieved from said main memory and stored into one of said cache lines using said progress indicator of said cache fill in progress if a match was determined by said second matching logic.

12. The apparatus as set forth in claim 10, wherein,
said cache fill descriptive information stored in said cache miss buffer further comprises a progress indicator; and
said control logic further comprises:
 d.3) determining logic coupled to said cache miss buffer for determining whether said instruction/data requested is going to be the next instruction/data being returned from said main memory using said progress indicator of said cache fill in progress if a match was determined by said second matching logic.

13. The apparatus as set forth in claim 9, wherein,
said cache array stores said memory block frames of said main memory in said cache lines in a set associative manner; and
said cache fill descriptive information stored in said cache miss buffer further comprises an index and a block value, said index identifying a cache set for storing said memory block frame of said cache fill in progress, said block value identifying a cache line of said cache set for storing said memory block frame of said cache fill in progress.

14. The apparatus as set forth in claim 9, wherein, each cache operation performed against said cache array and said cache tag array takes only half of a clock cycle.

15. The apparatus as set forth in claim 9, wherein,
said cache array is an instruction cache array;
said cache tag array is an instruction cache tag array;
said cache miss buffer is an instruction cache miss buffer; and
said instruction/data request is an instruction request.

16. The apparatus as set forth in claim 9, wherein,
said cache array is a data cache array;
said cache tag array is a data cache tag array;
said cache miss buffer is a data cache miss buffer; and said instruction/data request is a data request.

17. A computer system comprising:
 a) at least one execution function unit;
 b) a main memory; and
 c) a cache memory coupled to said at least one execution function unit and said main memory for caching instructions and data, said cache memory comprising at least one cache array, at least one cache tag array, at least one cache miss buffer and at least one cache control logic, said cache memory satisfying an instruction/data request requesting an instruction/data that is part of a memory block frame of a cache fill in progress without having to wait for said cache fill in progress to complete.

18. The computer system as set forth in claim 17, wherein, said cache memory comprises:
 c.1) an instruction cache memory coupled to said at least one function unit and said main memory for caching instructions, said instruction cache memory comprising an instruction cache array, an instruction cache tag array, an instruction cache miss buffer and an instruction cache control logic, said instruction cache memory satisfying an instruction request requesting an instruction that is part of a memory block frame of a cache fill in progress without having to wait for said cache fill in progress to complete; and
 c.2) a data cache memory coupled to said at least one function unit and said main memory for caching data, said data cache memory comprising an data cache array, a data cache tag array, a data cache miss buffer and a data cache control logic, said data cache memory satisfying a data request requesting a data that is part of a memory block frame of a cache fill in progress without having to wait for said cache fill in progress to complete.

* * * * *